United States Patent
Matsuda et al.

(10) Patent No.: US 10,619,029 B2
(45) Date of Patent: Apr. 14, 2020

(54) FLAME RETARDANT COMPOSITION

(71) Applicant: CANON KABUSHIKI KAISHA, Tokyo (JP)

(72) Inventors: Katsuhiro Matsuda, Kawasaki (JP); Toshinari Miura, Kawasaki (JP); Takeshi Komuro, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/039,293

(22) PCT Filed: Nov. 12, 2014

(86) PCT No.: PCT/JP2014/080700
§ 371 (c)(1),
(2) Date: May 25, 2016

(87) PCT Pub. No.: WO2015/080005
PCT Pub. Date: Jun. 4, 2015

(65) Prior Publication Data
US 2017/0158841 A1 Jun. 8, 2017

(30) Foreign Application Priority Data

Nov. 28, 2013 (JP) ................................. 2013-245902

(51) Int. Cl.
*C08K 5/523* (2006.01)
*B29C 48/00* (2019.01)
(Continued)

(52) U.S. Cl.
CPC .......... *C08K 5/523* (2013.01); *B29C 45/0001* (2013.01); *B29C 48/022* (2019.02);
(Continued)

(58) Field of Classification Search
None
See application file for complete search history.

(56) References Cited

U.S. PATENT DOCUMENTS 4,125,323 A * 11/1978 Ikeda ................... G03G 15/041
355/60
5,677,096 A * 10/1997 Suzuki ................. G03G 5/0696
430/58.65
(Continued)

FOREIGN PATENT DOCUMENTS

| CN | 101495599 A | 7/2009 |
| CN | 102361937 A | 2/2012 |

(Continued)

OTHER PUBLICATIONS

J.F. Cajaiba De Silva, et al., (1997) "One-Pot" Synthesis of Triaryl Phosphates a Reaction Calorimetry Approach, Phosphorus, Sulfur, and Silicon and the Related Elements, 131:1, 71-82,DOI 10.1080/10426509708031597.

*Primary Examiner* — Vivian Chen
(74) *Attorney, Agent, or Firm* — Canon USA, Inc., IP Divsion

(57) ABSTRACT

The present invention provides a flame retardant composition including a flame retardant that is extracted from a plant and can exhibit high flame retardancy. The flame retardant composition includes a flame retardant compound represented by Formula (1) and polybutylene terephthalate. The content of the flame retardant compound is 12% by weight or more and 15% by weight or less based on the total weight of the flame retardant compound and the polybutylene terephthalate.

(Continued)

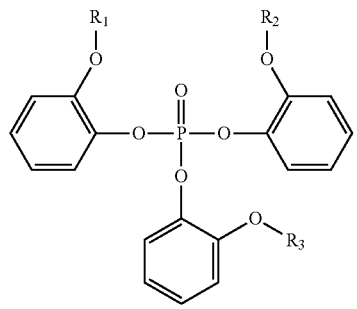

In Formula (1), $R_1$ to $R_3$ represent substituents.

9 Claims, 2 Drawing Sheets

(51) Int. Cl.
C08K 5/521 (2006.01)
B29C 45/00 (2006.01)
C09K 21/12 (2006.01)
G03G 21/16 (2006.01)
B29K 67/00 (2006.01)
B29K 105/00 (2006.01)
G03G 21/18 (2006.01)
C08K 5/00 (2006.01)
B32B 27/36 (2006.01)
C08K 5/49 (2006.01)
C08K 5/52 (2006.01)
C08L 67/02 (2006.01)
G03G 15/00 (2006.01)
C08L 67/03 (2006.01)
B29L 31/00 (2006.01)

(52) U.S. Cl.
CPC ............. *C08K 5/521* (2013.01); *C09K 21/12* (2013.01); *G03G 21/1619* (2013.01); *B29C 45/00* (2013.01); *B29C 48/00* (2019.02); *B29K 2067/00* (2013.01); *B29K 2067/006* (2013.01); *B29K 2105/0026* (2013.01); *B29K 2995/0016* (2013.01); *B29L 2031/767* (2013.01); *B32B 27/36* (2013.01); *B32B 2307/3065* (2013.01); *B32B 2367/00* (2013.01); *B32B 2457/00* (2013.01); *C08K 5/00* (2013.01); *C08K 5/0066* (2013.01); *C08K 5/49* (2013.01); *C08K 5/52* (2013.01); *C08K 2201/00* (2013.01); *C08L 67/02* (2013.01); *C08L 67/03* (2013.01); *C08L 2207/20* (2013.01); *G03G 15/00* (2013.01); *G03G 21/16* (2013.01); *G03G 21/1661* (2013.01); *G03G 21/1666* (2013.01); *G03G 21/1671* (2013.01); *G03G 21/181* (2013.01); *G03G 2215/00* (2013.01)

(56) References Cited

U.S. PATENT DOCUMENTS

| | | | | |
|---|---|---|---|---|
| 5,759,725 A * | 6/1998 | Hirao | .................... | B82Y 10/00 430/130 |
| 5,837,757 A * | 11/1998 | Nodera | .................... | C08K 3/22 524/141 |
| 6,331,371 B1 * | 12/2001 | Matsui | .................... | G03G 5/00 430/131 |
| 6,369,142 B1 * | 4/2002 | Nodera | ................ | C08K 5/1515 524/109 |
| 6,465,555 B1 * | 10/2002 | Nodera | .................... | C08K 3/02 524/111 |
| 9,657,171 B2 * | 5/2017 | Matsuda | ................ | C08L 69/00 |
| 2002/0016392 A1 * | 2/2002 | Nodera | .................. | C08K 5/103 524/311 |
| 2003/0058325 A1 * | 3/2003 | Fukui | .................. | G03G 15/326 347/133 |
| 2003/0162870 A1 * | 8/2003 | Kimura | .................. | C08K 5/523 524/127 |
| 2003/0195281 A1 * | 10/2003 | Janke | ........................ | C07F 9/12 524/115 |
| 2004/0012003 A1 * | 1/2004 | Tabushi | ................. | C08K 5/521 252/601 |
| 2004/0132876 A1 * | 7/2004 | Yamanaka | ............... | C08K 5/51 524/108 |
| 2004/0152808 A1 * | 8/2004 | Tezuka | .................. | C08F 257/02 524/127 |
| 2004/0254270 A1 * | 12/2004 | Harashina | ................ | C08K 3/24 524/86 |
| 2005/0014003 A1 * | 1/2005 | Takei | ...................... | C08F 14/26 428/407 |
| 2006/0142438 A1 * | 6/2006 | Ishii | ........................ | C08L 67/02 524/100 |
| 2006/0214142 A1 | 9/2006 | Nikkeshi | | |
| 2007/0232742 A1 * | 10/2007 | Maehara | .................. | C08K 9/04 524/445 |
| 2010/0076133 A1 * | 3/2010 | Yamaguchi | ............... | C08K 3/34 524/188 |
| 2011/0021740 A1 * | 1/2011 | Van Benthem | ...... | C07D 307/48 528/249 |
| 2011/0124839 A1 * | 5/2011 | Matsuda | ............ | C08G 63/6926 528/365 |
| 2011/0130498 A1 * | 6/2011 | Shinagawa | ............. | C08L 67/02 524/136 |
| 2012/0052281 A1 * | 3/2012 | Ishiguro | ................ | B29C 43/003 428/220 |
| 2012/0184662 A1 * | 7/2012 | van der Mee | .......... | C08L 67/02 524/451 |
| 2016/0068553 A1 * | 3/2016 | Matsuda | .................. | C07F 9/12 524/145 |
| 2016/0083579 A1 * | 3/2016 | Matsuda | ................ | C08L 69/00 399/159 |
| 2016/0289425 A1 * | 10/2016 | Matsuda | ................ | C08K 5/523 |
| 2016/0369093 A1 * | 12/2016 | Komuro | ............ | G03G 21/1619 |
| 2017/0158841 A1 * | 6/2017 | Matsuda | ................ | C08K 5/523 |

FOREIGN PATENT DOCUMENTS

| | | |
|---|---|---|
| CN | 102532191 A | 7/2012 |
| EP | 0 595 597 A * | 5/1994 |
| JP | 10-0338802 A | 12/1998 |
| JP | 11-080381 A | 3/1999 |
| JP | 11-080568 A * | 3/1999 |
| JP | 2000-169692 A | 6/2000 |
| JP | 2001-026709 A * | 1/2001 |
| JP | 2001-26709 A | 1/2001 |
| JP | 2002-348575 A | 12/2002 |
| JP | 2006-77215 A | 3/2006 |
| JP | 2008-024890 A * | 2/2008 |
| JP | 2011-132506 A | 7/2011 |
| JP | 2014/224096 A | 12/2014 |
| WO | 2011/122464 A1 | 10/2011 |
| WO | WO 2011/122464 A * | 10/2011 |
| WO | WO 2014/171122 A * | 10/2014 |
| WO | WO 2014/185066 A * | 11/2014 |

* cited by examiner

FLAME RETARDANT COMPOSITION

CROSS-REFERENCE TO RELATED APPLICATIONS

This application is a National Stage filing of International Application No. PCT/JP2014/080700 filed Nov. 12, 2014, which claims the benefit of Japanese Patent Application No. 2013-245902, filed Nov. 28, 2013, the disclosures of each of which are hereby incorporated by reference herein in their entirety.

TECHNICAL FIELD

The present invention relates to a flame retardant composition including polybutylene terephthalate.

BACKGROUND ART

Resins used for electric and electronic parts have been provided with flame retardancy by flame retardants depending on the use or the portion to which a resin is applied. As the flame retardant, for example, bromine-based flame retardants, phosphorus-based flame retardants, inorganic flame retardants, and silicone-based flame retardants are known. For example, a polybutylene terephthalate resin, which is widely used in copiers, contains a phosphorus-based flame retardant mixed therein to have a flame retardancy of V-2 to V-0 of the standard UL-94, depending on the use.

Meanwhile, from the viewpoint of reducing the consumption of petroleum resources, biomass-derived resins prepared from plants have received attention. For example, polylactic acid is produced from starch such as corn starch. The biomass-derived resins are improved in strength and flame retardancy by an alloy with a petroleum-derived resin or an additive and are actually used in the housings of copiers and other apparatuses.

However, in flame retardants, petroleum-derived materials are still used, and development of a flame retardant from a renewable resource such as a plant is being demanded from the above-described viewpoints.

PTL 1 describes tannin as a flame retardant obtained from a plant. PTL 2 describes potassium hydrogen tartrate as a flame retardant obtained from a plant.

Unfortunately, these flame retardants could not realize a high flame retardancy in accordance with the standard UL-94 for being used in members of copiers when they are added to polybutylene terephthalate. This is believed to be caused by low compatibility with resins due to hydrophilicity of the tannin and potassium hydrogen tartrate.

CITATION LIST

Patent Literature

PTL 1 Japanese Patent Laid-Open No. 2006-77215
PTL 2 Japanese Patent Laid-Open No. 2002-348575

SUMMARY OF INVENTION

The present invention provides a flame retardant composition including a flame retardant compound prepared from a plant and having a high flame retardancy.

The present invention provides a flame retardant composition comprising polybutylene terephthalate and a flame retardant compound represented by Formula (1):

[Chem. 1]

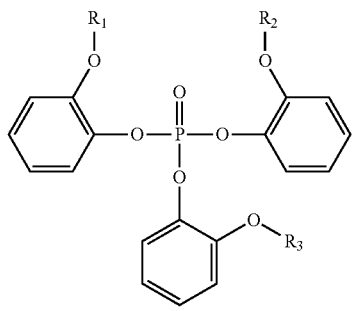

wherein $R_1$ to $R_3$ each independently represent an alkyl group, wherein the content of the flame retardant compound is 12% by weight or more and 15% by weight or less based on the total weight of the flame retardant compound and the polybutylene terephthalate.

Further features of the present invention will become apparent from the following description of exemplary embodiments with reference to the attached drawings.

DESCRIPTION OF EMBODIMENTS

Figure 1A:
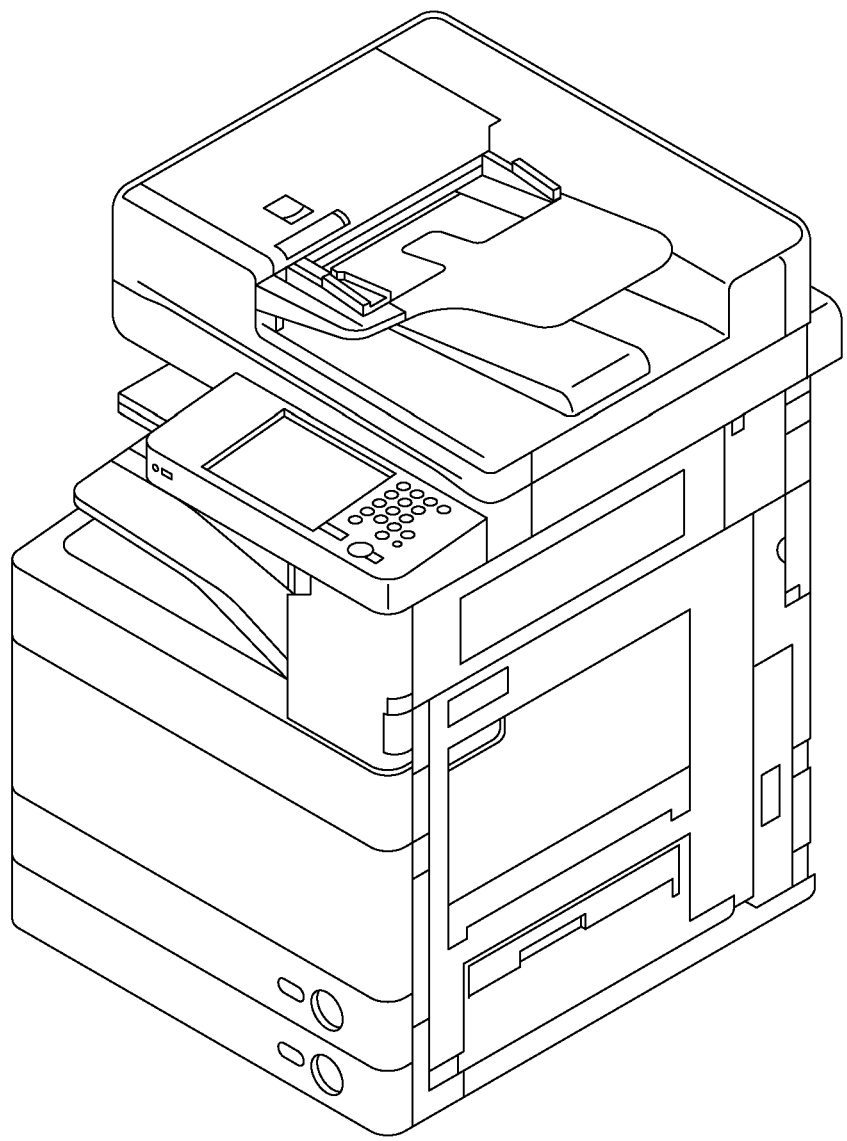
FIG. 1A is an external view of an exemplary image-forming apparatus according to an embodiment of the present invention.

The present invention relates to a flame retardant composition comprising a flame retardant compound and polybutylene terephthalate.

The flame retardant compound according to the present invention is represented by Formula (1), and the content thereof is 12% by weight or more and 15% by weight or less based on the total weight of the flame retardant compound and the polybutylene terephthalate. This flame retardant compound can be synthesized from guaiacol.

In this embodiment, the flame retardant compound shown below is also called flame retardant or Component A as a component of a flame retardant composition. The polybutylene terephthalate is also called Component B.

[Chem. 2]

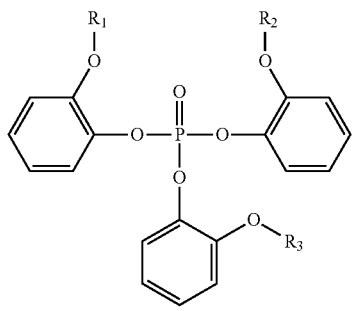

In Formula (1), $R_1$ to $R_3$ each independently represent an alkyl group. The number of carbon atoms of the alkyl group is not limited and is preferably one to eight, more preferably one to four, and most preferably one such that each of $R_1$ to $R_3$ represents a methyl group.

The content of the polybutylene terephthalate according to the present invention is 85% by weight or more and 88% by weight or less based on the total weight of Component A and Component B.

The flame retardant compound according to the present invention has a high flame retardancy and is lipophilic because the structure includes alkyl groups and does not include hydroxy groups. Thus, the flame retardant compound is highly compatible with a resin including polybutylene terephthalate and therefore can exhibit high flame retardancy even when it is contained in the resin. Throughout the embodiment, the term "high flame retardancy" refers to a flame retardancy of at least V-2 of the standard UL-94.

In contrast, tannin is hydrophilic due to the presence of hydroxy groups in the structure, and potassium hydrogen tartrate is a salt to shows low compatibility with resins. Therefore, they cannot exhibit high flame retardancy when they are contained in a resin.

The flame retardant compound according to the present invention can exhibit high flame retardancy even when it is contained in a resin including polybutylene terephthalate.

The flame retardant compound according to the present invention can be produced by, for example, the following method.

The flame retardant compound according to the present invention can be prepared by esterifying guaiacol obtained from a plant and phosphorus oxychloride in the presence of a base or a catalyst through a known process as shown in the following reaction formula (2):

[Chem. 3]

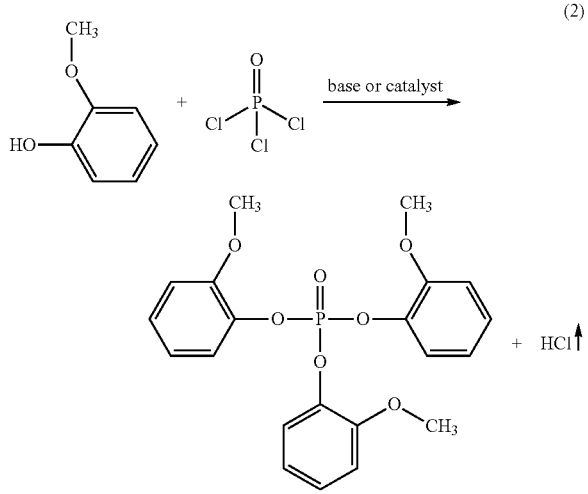

(2)

The reaction formula (2) shows a process of producing the compound represented by the following structural formula (1) as an example. Various flame retardant compounds according to the present invention can be produced by appropriately selecting substituents and starting materials.

[Chem. 4]

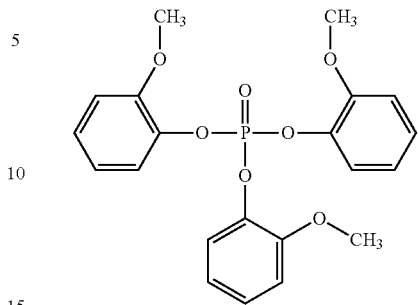

Structural formula (1)

The process can be performed in the presence of a base or a catalyst for accelerating the esterification in reaction formula (2). The base traps the by-produced hydrogen chloride to form a hydrochloride of the base. Accordingly, the equilibrium in the esterification can be shifted toward the reaction productions, accelerating the reaction rate and increasing the yield.

Examples of the base include tertiary amines, such as triethylamine and pyridine, and alkali metal hydroxides. Primary amines and secondary amines form phosphoric amides, in addition to phosphate esters, resulting in low yields of the phosphate esters. Alternatively, the reaction can be accelerated by heating in the presence of a Lewis acid such as magnesium chloride.

The reaction mixture prepared in the above-described reaction can be purified by a known isolation method to reduce the amount of the residual unreacted materials and catalyst, specifically, to 1% by weight or less. A large amount of the residual unreacted materials and catalyst decreases the flame retardancy and deteriorates the resin during kneading, which may cause a reduction in physical properties. Examples of the isolation method include filtration, washing, and drying.

The flame retardant compound represented by structural formula (1) prepared by the above-described method has a melting point of 99° C. measured with a differential scanning calorimeter (DSC) and a 5% weight reduction temperature of 249° C. measured with a thermogravimetry analyzer (TGA). These values demonstrate that the flame retardant compound can sufficiently bear the temperature for kneading polybutylene terephthalate.

Guaiacol that is used in the flame retardant compound according to the present invention may be prepared from a plant from the viewpoint of reducing the consumption of petroleum resources. The guaiacol can be prepared from a plant by a known method by, for example, distilling wood vinegar, which is generated in production of charcoal from beech, guaiacum wood, etc. Chemically synthesized guaiacol also can be used.

In the embodiment, the compound to be reacted with guaiacol for esterification is a chloride of phosphorus. The flame retardant compound of guaiacol can also be produced through a reaction of guaiacol with a chloride of a phosphorus-nitrogen compound, such as cyclic phosphonitrile dichloride, or a chloride of a nitrogen compound, such as trichloro-1,3,5-triazine.

The compound to be reacted with guaiacol can be a chloride of a phosphorus-nitrogen compound or a chloride of phosphorus, in particular, a chloride of phosphorus.

These reactions can be performed as in the reaction of guaiacol and phosphorus oxychloride, a chloride of phosphorus. The reaction product of cyclic phosphonitrile dichloride and guaiacol is a cyclic phosphonitrile phosphate ester.

The reaction product of trichloro-1,3,5-triazine and guaiacol is tris(methoxyphenoxy)-1,3,5-triazine.

The flame retardant composition of the present invention will now be described.

The content of the flame retardant compound (Component A) in the flame retardant composition of the present invention can be 12% by weight or more and 15% by weight or less based on the total weight of Component A and Component B. A content of less than 12% by weight decreases the flame retardant effect, and a content of higher than 15% by weight decreases the strength.

The polybutylene terephthalate (Component B) in the flame retardant composition according to the present invention is represented by structural formula (2):

[Chem. 5]

structural formula (2)

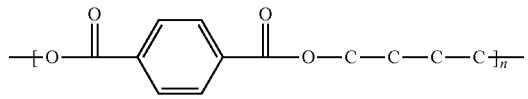

wherein, n is an integer of 100 or more, representing the degree of polymerization. If n is less than 100, the flame retardant composition has low strength.

The content of the polybutylene terephthalate (Component B) in the flame retardant composition of the present invention can be 85% by weight or more and 88% by weight or less based on the total weight of Component A and Component B. A content of less than 85% by weight decreases the strength of the flame retardant composition, and a content of higher than 88% by weight reduces the content of the flame retardant, resulting in a reduction in flame retardancy.

The polybutylene terephthalate to be used in a member of a copier is required to have a flame retardancy of V-2 of the standard UL-94. That is, the flame retardant composition according to the present invention has a flame retardancy of at least V-2 and can be used in a member of a copier.

The flame retardant composition according to the present invention may further comprise a fluorine-containing compound. Examples of the fluorine-containing compound include polytetrafluoroethylene (PTFE).

The content of the fluorine-containing compound in the flame retardant composition of the embodiment can be 0.1% by weight or more and 1% by weight or less based on the total weight of the composition.

A content within a range of 0.1% by weight or more and 1% by weight or less barely causes melting drip of the resin from a flame test piece at flame contact.

In light of environmental impact, the content of fluorine in the flame retardant composition of the embodiment can be 0.5% by weight or less based on the total weight of the flame retardant composition.

For example, when the fluorine-containing compound comprises a compound including 50% by weight of fluorine, the content of the fluorine-containing compound can be 1% by weight or less based on the total amount of the flame retardant composition.

In a process of producing the flame retardant composition according to the present invention, the flame retardant compound is added in an amount of 12% by weight or more and 15% by weight or less based on the total weight of the flame retardant compound and a polymer of styrene or an aromatic polyester.

That is, the polybutylene terephthalate is added in an amount of 85% by weight or more and 88% by weight or less based on the total weight of the flame retardant compound and polybutylene terephthalate.

Regarding the weight proportions of the components of the flame retardant composition according to the embodiment, the proportions of the charged amounts may be regarded as the composition ratios of the composition. Alternatively, the composition ratios of the composition can be measured by NMR.

The flame retardant composition of the present invention may further contain a pigment, a thermal stabilizer, an antioxidant, an inorganic filler, plant fibers, a weather-resistant agent, a lubricant, a parting agent, an antistatic agent, or other additives that do not materially impair the characteristics of the flame retardant composition.

The compact of the flame retardant composition of the present invention can be molded into a desired shape. The molding can be performed by any method such as extrusion molding or injection molding.

The polybutylene terephthalate (PBT) contained in the flame retardant composition according to the embodiment may be recovered PBT. The recovered PBT can also be referred to as a recovered resin. In a case of using recovered PBT, the flame retardant composition can also be called a recycled resin. The recycled resin can be produced by adding the flame retardant composition according to the present invention to the prepared PBT.

Examples of the recovered PBT include resins used in the housings of image-forming apparatuses, resins used in camera parts, and resins used in personal computer housings and internal parts, television housings and internal parts, and water bottles.

The compact according to the embodiment can be prepared by molding the composition comprising the flame retardant compound according to the present invention. The molding can be performed by a known technology such as extrusion molding or injection molding.

The compact according to the embodiment can be used in internal parts of copiers, internal parts of laser beam printers, housings and internal parts of ink jet printers, toner cartridge parts of copiers and laser beam printers, housings and internal parts of facsimile machines, camera parts, housings and internal parts of personal computers, and housings and internal parts of televisions.

The image-forming apparatus according to the embodiment is an electrographic image-forming apparatus including a light source and a photoreceptor and includes a housing accommodating the photoreceptor. The flame retardant composition according to the present invention is used in the housing.

The compact according to the embodiment can be used in parts required to have flame retardancy in image-forming apparatuses such as copiers, laser beam printers, and ink jet printers. Specifically, the parts are housings accommodating photoreceptors, members adjoining fixing devices, and members adjoining power sources.

Furthermore, the compact can also be used in exterior materials when it does not affect the design.

Figure 1B:
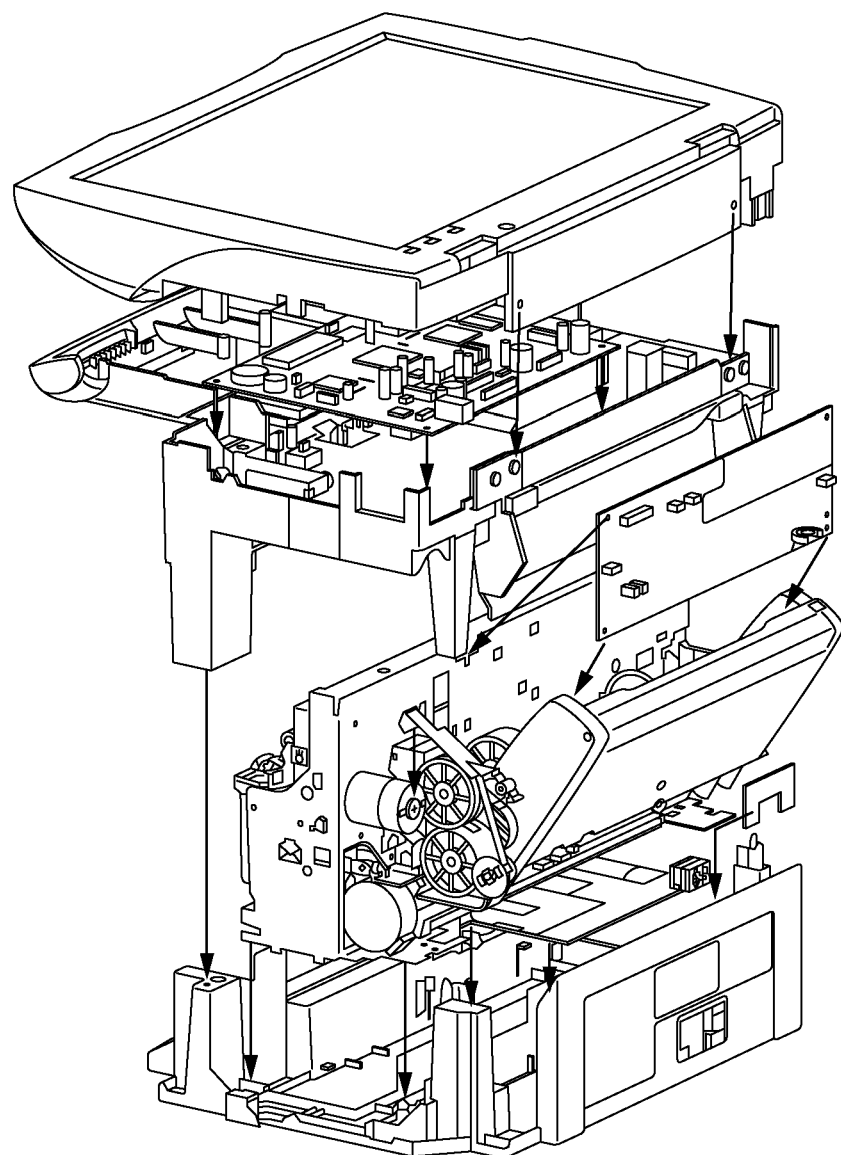
FIG. 1B is a schematic view of an exemplary image-forming apparatus according to an embodiment of the present invention.

An example of the image-forming apparatus according to the embodiment is shown in FIGS. 1A and 1B. FIG. 1A is an external view of an example of the image-forming apparatus and shows the exterior material. FIG. 1B is a schematic view illustrating an example of the inside of the image-forming apparatus and shows the internal parts.

EXAMPLES

Examples of the present invention will now be described. The technical scope of the present invention is not limited to the examples. The measurement and evaluation were performed by the following methods and apparatuses.
(1) Flame Retardancy
   Test procedure: V test based on the standard UL-94 (20-mm vertical flame test)
   Sample shape: flame retardancy test piece (125 mm long×12.5 mm wide×1.5 mm thick)
(2) Melting Point (Tm) Measurement
   Apparatus: differential scanning calorimeter manufactured by TA Instruments
   Pan: aluminum pan
   Sample weight: 3 mg
   Heating starting temperature: 30° C.
   Rate of temperature rise: 10° C./min
   Atmosphere: nitrogen
(3) Thermal Decomposition (Td) Measurement
   Apparatus: thermogravimetry analyzer manufactured by TA Instruments
   Pan: platinum pan
   Sample weight: 3 mg
   Heating starting temperature: 30° C.
   Measurement mode: dynamic rate mode[*1]
   Atmosphere: nitrogen
*1: Dynamic rate mode is a measurement mode to improve the resolution by controlling the heating rate depending on the degree in change of weight.

Production Example 1: Synthesis of Flame Retardant (Component A)
   Guaiacol (470.8 g, 3.72 mol) dehydrated with $MgSO_4$ and phosphorus oxychloride (190.0 g, 1.23 mol) were measured in a 3-L separable flask and were stirred with a mechanical stirrer under nitrogen.
   To the mixture was added 1.5 L of THF (moisture content: 20 ppm or less). Triethylamine (486.6 g, 4.78 mol) was further added to the mixture with a dropping funnel over 1.5 hours, followed by reaction at an internal temperature of 60° C. for 18 hours. The resulting reaction mixture was neutralized with an aqueous solution of NaOH. The hydrochloride of triethylamine was removed by filtration to give light yellow filtrate.
   The filtrate was concentrated with an evaporator, and the resulting reaction mixture was spread in 5 L of water to yield a white crystalline product. The product was washed in 5 L of water for 12 hours by stirring with a mechanical stirrer twice, followed by filtration and vacuum drying at 70° C. for 48 hours to give flame retardant (Component A, yield: 93%).
   The thus-prepared flame retardant (Component A) had a melting temperature (Tm) of 99° C. measured with a differential scanning calorimeter (DSC) and a 5% weight reduction temperature (Td) of 249° C. measured with a thermogravimetry analyzer (TGA). These results demonstrate that the flame retardant has thermal properties sufficiently bearing kneading with polybutylene terephthalate.
   The structure of the flame retardant was identified by $^1$H-NMR, which did not show a peak of the proton of hydroxy group of guaiacol.

Meanwhile, peaks of the protons of benzene ring of guaiacol were observed at δ=7.40 ppm, 7.42 ppm, δ=7.11 ppm, 7.13 ppm, and δ=6.87 ppm, 6.87 ppm, 6.89 ppm, 6.92 ppm, 6.94 ppm; and peaks of the protons of methoxy group of guaiacol were observed at δ=3.76 ppm, 3.79 ppm.
   The ratio of the integrate value (a) of the protons of benzene ring of guaiacol to the integrated value (b) of the protons of methoxy group of guaiacol, (a):(b), was 4:3. It is therefore obvious that this product has structural formula (1).

Examples 1 to 3 and Comparative Examples 1 to 5

The polybutylene terephthalate (PBT) used in examples and comparative examples was dried in a pellet form with hot wind of 120° C. for 8 hours.
   The materials shown in Tables 1 and 2 were weighed to give the mass ratios shown in Tables 1 and 2 and were mixed. The mixtures were then each kneaded with a twin screw extruder (trade name: Laboplastomill, manufactured by Toyo Seiki Seisaku-Sho, Ltd.) at a cylinder temperature of 225° C. to 230° C.
   The resulting pellet was dried with hot wind of 80° C. for 6 hours and was then molded into a flame retardancy test piece (125 mm long×12.5 mm wide×1.5 mm thick) with an injection molding machine (trade name: SE18DU, manufactured by Sumitomo Heavy Industries, Ltd.) at a cylinder temperature of 235° C. to 245° C. and a mold temperature of 60° C.
   In Comparative Example 5, the flame retardancy test piece (125 mm long×12.5 mm wide×1.5 mm thick) was molded, without performing kneading, with an injection molding machine (trade name: SE18DU, manufactured by Sumitomo Heavy Industries, Ltd.) at a cylinder temperature of 235° C. to 250° C. and a mold temperature of 60° C.
   The materials shown in Tables 1 and 2 are as follows:
   PBT: Toraycon 1401-X06 (Grade name), manufactured by Toray Industries, Inc.
   Guaiacol phosphoric acid ester (Component A): the same as that used in Production Example 1
   Tannic acid: manufactured by Kishida Chemical Co., Ltd.
   Sodium laurate: manufactured by Kishida Chemical Co., Ltd.
   Sucrose: manufactured by Kishida Chemical Co., Ltd.
   Potassium hydrogen tartrate: manufactured by Kishida Chemical Co., Ltd.
   Table 1 shows the blending ratios and the results of flame retardancy (V test) in Examples 1 to 3. Table 2 shows the blending ratios and the results of flame retardancy (V test) in Comparative Examples 1 to 5. Table 3 shows criteria of the V test (20-mm vertical flame test) of the standard UL-94.

TABLE 1

|  | Example 1 | Example 2 | Example 3 |
|---|---|---|---|
| PBT | 88 | 86.5 | 85 |
| Guaiacol phosphoric acid esters (GPEs) | 12 | 13.5 | 15 |
| UL-94 class | V-2 | V-2 | V-2 |

TABLE 2

|  | Comparative Example 1 | Comparative Example 2 | Comparative Example 3 | Comparative Example 4 | Comparative Example 5 |
|---|---|---|---|---|---|
| PBT | 90 | 89 | 99.45 | 90 | 100 |
| Guaiacol phosphoric acid esters (GPEs) | 10 | 11 | | | |
| Tannic acid | | | 0.15 | | |
| Sucrose | | | 0.30 | | |
| Sodium laurate | | | 0.10 | | |
| Potassium hydrogen tartrate | | | | 10 | |
| UL-94 class | NG | NG | NG | NG | NG |

TABLE 3

|  | V-0 | V-1 | V-2 |
|---|---|---|---|
| Burning time after first or second removal of flame in each sample | ≤10 sec | ≤30 sec | ≤30 sec |
| Total of burning time after removal of flame for 10 times | ≤50 sec | ≤250 sec | ≤250 sec |
| Total of burning time after second removal of flame and kindling time | ≤30 sec | ≤60 sec | ≤60 sec |
| Ignition of absorbent cotton by burning drops | none | none | occurred |

In Examples 1 to 3 shown in Table 1, a flame retardancy corresponding to V-2 of the standard UL-94, which satisfies the requirement in members of copiers, was obtained.

The test pieces in Comparative Examples 1 to 5 shown in Table 2 did not conform to the V test and could not satisfy a flame retardancy of V-2 of the standard UL-94, which is required to polybutylene terephthalate when used in a member of a copier.

According to the present invention, a flame retardant composition having a high flame retardancy can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A flame retardant composition comprising:
polybutylene terephthalate, and
a flame retardant compound represented by Formula (1):

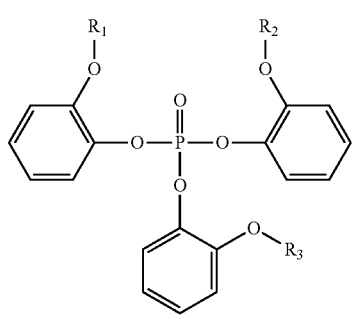

(1)

wherein $R_1$ to $R_3$ each represent a methyl group,
wherein the content of the flame retardant compound is 12% to 15% by weight based on the total weight of the flame retardant composition, and
the content of the polybutylene terephthalate is 85% to 88% by weight based on the total weight of the flame retardant composition.

2. The flame retardant composition according to claim 1, wherein the polybutylene terephthalate has a degree of polymerization of 100 or more.

3. The flame retardant composition according to claim 1, wherein the polybutylene terephthalate is a recovered resin.

4. A compact molded from the flame retardant composition according to claim 1.

5. The compact according to claim 4, having a flame retardancy of at least V-2 in a V test based on the standard UL-94.

6. An electrographic image-forming apparatus comprising:
a light source; and
a photoreceptor,
wherein a housing accommodating the photoreceptor includes the compact according to claim 4.

7. A method of producing a flame retardant composition comprising a flame retardant compound represented by Formula (1) and polybutylene terephthalate, the polybutylene terephthalate prepared in an amount of 85% to 88% by weight based on the total weight of the flame retardant composition, wherein
the flame retardant compound is added in an amount of 12% by weight or more and 15% by weight or less based on the total weight of the flame retardant composition,

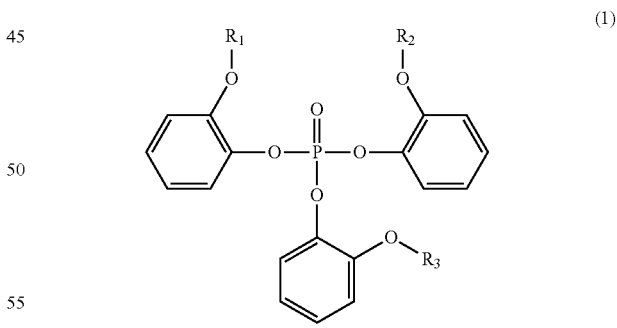

(1)

wherein $R_1$ to $R_3$ each represent a methyl group.

8. A method of producing a compact, comprising:
preparing a flame retardant composition by the method of producing a flame retardant composition according to claim 7; and
molding the flame retardant composition.

9. The method of producing a compact according to claim 8, wherein the molding is performed by injection molding or extrusion molding.

* * * * *